US009523588B2

(12) United States Patent
Yoo et al.

(10) Patent No.: US 9,523,588 B2
(45) Date of Patent: Dec. 20, 2016

(54) METHOD AND APPARATUS FOR PREDICTING AND CORRECTING METERING DATA IN NON-METERED SECTION

(71) Applicant: ELECTRONICS AND TELECOMMUNICATIONS RESEARCH INSTITUTE, Daejeon (KR)

(72) Inventors: Yoon-Sik Yoo, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 574 days.

(21) Appl. No.: 14/053,008

(22) Filed: Oct. 14, 2013

(65) Prior Publication Data

US 2014/0257728 A1    Sep. 11, 2014

(30) Foreign Application Priority Data

Mar. 6, 2013 (KR) .................. 10-2013-0023711

(51) Int. Cl.
*G01D 4/00* (2006.01)
*G01D 3/02* (2006.01)
*G06Q 30/02* (2012.01)

(52) U.S. Cl.
CPC ............... *G01D 4/004* (2013.01); *G01D 3/02* (2013.01); *G06Q 30/02* (2013.01); *Y02B 90/241* (2013.01); *Y04S 20/32* (2013.01)

(58) Field of Classification Search
CPC ........ G01D 4/002; G01D 4/004; Y02B 90/24; Y02B 90/241; Y04S 20/30; Y04S 20/32; G06Q 50/06

USPC .......... 702/85, 179, 180, 182, 183; 700/291; 705/1.1

See application file for complete search history.

(56) References Cited

U.S. PATENT DOCUMENTS

2012/0232915 A1    9/2012  Bromberger
2014/0365174 A1*  12/2014  Arlitt .................... G06Q 50/06
                                                 702/182
2014/0379156 A1*  12/2014  Kamel .................... G05F 1/66
                                                 700/291

FOREIGN PATENT DOCUMENTS

JP    2006-244063 A    9/2006
KR    1020100012141 A  2/2010
KR    1020100048738 A  5/2010
KR    1020120086068 A  8/2012

OTHER PUBLICATIONS

Yoon-Sik Yoo, et al; "Analysis of Energy Saving Effects on Korean Style Residential Buildings using Energy Information Device for Smart Metering", Energy 2013: The Third International Conference on Smart Grids, Green Communications and IT Energy-aware Technologies, Mar. 24-29, 2013, Lisbon, Portugal.

* cited by examiner

*Primary Examiner* — John H Le
(74) *Attorney, Agent, or Firm* — Ladas & Parry LLP

(57) ABSTRACT

A method for predicting and correcting metering data in a non-metered section includes collecting energy-related metering data. The method includes generating, when a non-metered section occurs while collecting the metering data, predicted metering data for the non-metered section; and generating corrected metering data for the predicted metering data by analyzing history of the predicted metering data and collected metering data.

20 Claims, 6 Drawing Sheets

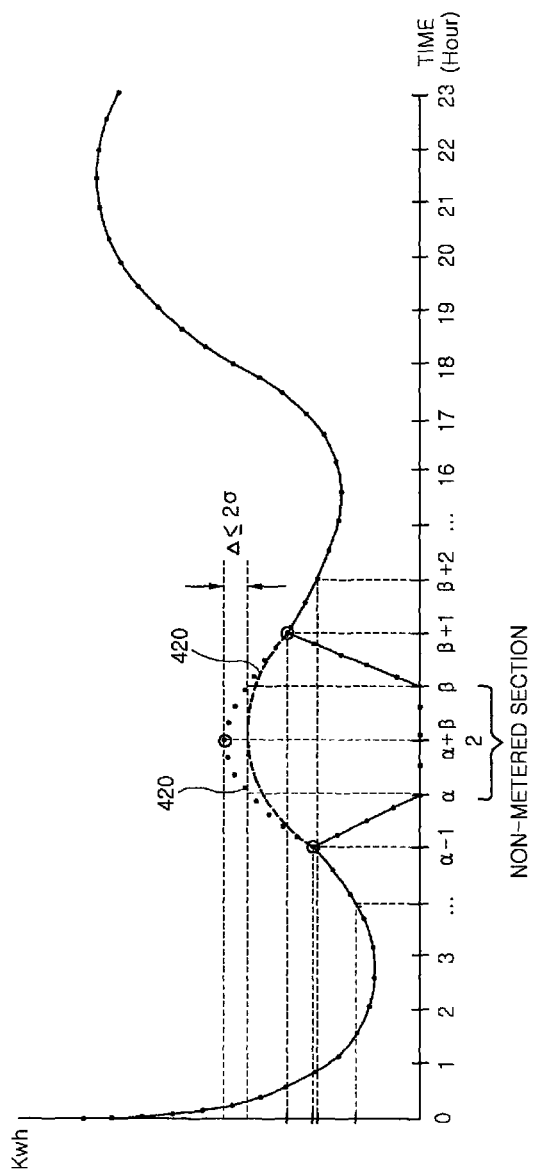

METHOD AND APPARATUS FOR PREDICTING AND CORRECTING METERING DATA IN NON-METERED SECTION

RELATED APPLICATIONS

This application claims the benefit of Korean Patent Application No. 10-2013-0023711, filed on Mar. 6, 2013, which is hereby incorporated by reference as if fully set forth herein.

FIELD OF THE INVENTION

The present invention relates to a process when a non-metered section occurs in an integrated remote metering system, and more particularly, to a method and apparatus for generating predicted metering data and correcting metering data for a non-metered section based on previous metered data.

BACKGROUND OF THE INVENTION

Generally, a remote metering system is constructed of a meter installed at home or office, an automatic meter reading (referred to as AMR, hereinafter) server that manages metering at a center, automatically charges customers according to metering data and manages customers, and a communication infrastructure for data communication between the AMR server and the meter.

In the remote metering system, the AMR server remotely meters and collects meterages of electricity, gas, water supply, hot water and heating from meters using the communication infrastructure and charges customers based on the metering data.

In such a conventional remote metering technology, however, since there may be a case where data are not metered in a metering section due to an error of a communication connection medium between the meter and the AMR server or an error occurring when data are transmitted therebetween, a problem occurs in that it is not easy to respond to a demand reaction of a customer in real time or manage metering data stably. Accordingly, there may be a case where while a metering was made at a meter, metering data could not reliably transmitted to the AMR server, and the metering data could be transmitted to an integrated metering system without being confirmed in its effectiveness. In the integrated metering system, therefore, it is needed that the AMR server is informed of a non-metered data section so as to request a retransmission to the meter. Further, when a non-metered section exists even after the request of a retransmission, it is needed to analyze the demand reaction of a customer in real time, predict the non-metered section and correct it with an effective value of the non-metered data.

SUMMARY OF THE INVENTION

In view of the above, the present invention provides a method and apparatus for predicting and correcting metering data for a non-metered section based on previous metered data or a history statistical value for the previous metered data when the non-metered section exists in remote metering data.

In accordance with an exemplary embodiment of the present invention, there is provided a method for predicting and correcting metering data in a non-metered section, which includes: collecting energy-related metering data; generating, when a non-metered section occurs while collecting the metering data, predicted metering data for the non-metered section; and generating corrected metering data for the predicted metering data by analyzing history of the predicted metering data and collected metering data.

In the exemplary embodiment, the generating the predicted metering data includes: generating a first function using metering data of a first section zone which is placed before the starting point of the non-metered section; generating a second function using metering data of a second section zone which is placed after the end point of the non-metered section; calculating an intersecting point of the first and second functions; and calculating predicted metering data for each timing point of the non-metered section by generating a third function that passes through the calculated intersecting point, a first coordinate of the first function, and a second coordinate of the second function.

In the exemplary embodiment, the first coordinate is the end portion of the first section zone and metering data of the end portion, and the second coordinate is a starting portion of the second section zone and metering data of the starting portion.

In the exemplary embodiment, the generating corrected metering data includes: correcting the predicted metering data by comparing the predicted metering data calculated with the previous metered data corresponding to the non-metered section or a history statistical value of the previous metered data corresponding to the non-metered section.

In the exemplary embodiment, the generating corrected metering data includes: calculating a difference between the previous metered data or the history statistical value and the predicted metering data; determining whether the difference is within a predetermined effective scope; setting, when the difference is within the predetermined effective scope, the predicted metering data as metering data for the non-metered section; and correcting, when the difference is not within a predetermined effective scope, predicted metering data of a portion which is not within the predetermined effective scope using the previous metered data or the maximum or minimum value of the history statistical value by comparing the predicted metering data of the portion which is not within the predetermined effective scope with the previous metered data or history statistical value.

In the exemplary embodiment, the correcting using the maximum or minimum value includes: correcting predicted metering data of the portion with the maximum value when predicted metering data of the portion having the difference is greater than the previous metered data or history statistical value; and correcting the predicted metering data of the portion with the minimum value when predicted metering data of the portion having the difference is equal to or smaller than the previous metered data or history statistical value.

In the exemplary embodiment, the effective scope is calculated using the previous metered data or a standard deviation of the history statistical value.

In the exemplary embodiment, the non-metered section is a unit of hour, day, month or year.

In accordance with another exemplary embodiment of the present invention, there is provided an apparatus for predicting and correcting metering data in a non-metered section, which includes: a metering data prediction unit configured to generate, when a non-metered section occurs while collecting energy-related metering data, predicted metering data for the non-metered section; and a correction unit configured to correct the predicted metering data by analyzing a history of the predicted metering data and collected metering data, thereby generating corrected metering data for the non-metered section.

In the exemplary embodiment, the predicted metering data generation unit is configured to: generate a first function using metering data of a first section zone which is placed before the starting point of the non-metered section; generate a second function using metering data of a second section zone which is placed after the end point of the non-metered section and then calculates an intersecting point of the first and second functions; and generate a third function that passes through the calculated intersecting point, a first coordinate of the first function, and a second coordinate of the second function, thereby generating predicted metering data for each timing point of the non-metered section.

In the exemplary embodiment, the first coordinate is the end portion of the first section zone and metering data of the end portion, and the second coordinate is a starting portion of the second section zone and metering data of the starting portion.

In the exemplary embodiment, the correction unit is configured to correct the predicted metering data by comparing the predicted metering data calculated with the previous metering data corresponding to the non-metered section or a history statistical value of the previous metering data corresponding to the non-metered section.

In the exemplary embodiment, the correction unit is configured to calculate a difference between the previous metered data or history statistical value and the predicted metering data, and determine whether or not to correct the predicted metering data by determining whether the difference is within a predetermined effective scope.

In the exemplary embodiment, the correction unit is configured to correct, when the difference is not within the predetermined effective scope, the predicted metering data of a portion which is not within the predetermined effective scope using the previous metered data or the maximum or minimum value of the history statistical value by comparing the predicted metering data of the portion and the previous metered data or history statistical value.

In the exemplary embodiment, the correction unit is configured to: correct predicted metering data of the portion with the maximum value when predicted metering data of the portion having the difference is greater than the previous metered data or history statistical value; and correct the predicted metering data of the portion with the minimum value when the predicted metering data of the portion having the difference is equal to or smaller than the previous metered data or history statistical value.

In the exemplary embodiment, the effective scope is calculated using the previous metered data or a standard deviation of the history statistical value.

In accordance with the present invention, it is possible to effectively monitor a customer energy usage by predicting and correcting metering data in a non-metered section occurring due to an error in a communication connection medium between a meter and an AMR server or an error occurring when data are transmitted therebetween, and to construct a metering database within an effective scope so as to use it as demand reaction data.

BRIEF DESCRIPTION OF THE DRAWINGS

The above and other objects and features of the present invention will become apparent from the following description of the embodiments given in conjunction with the accompanying drawings, in which:

FIG. 6 is a graph explaining a process to generate corrected metering data in accordance with an embodiment of the present invention.

DETAILED DESCRIPTION OF THE EMBODIMENTS

Hereinafter, the embodiments of the present invention will be described in detail with reference to the accompanying drawings.

Figure 1:
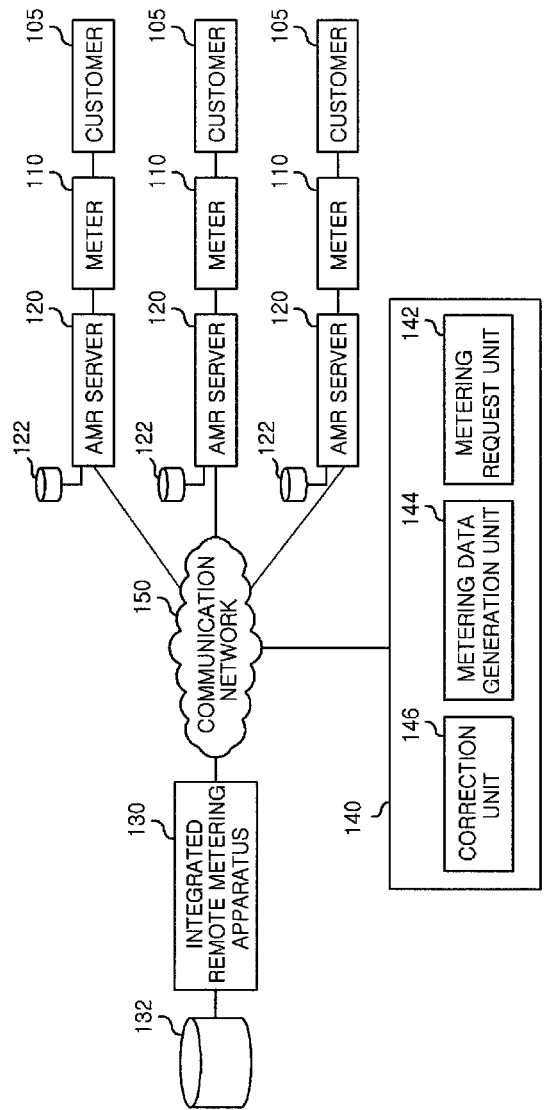
FIG. 1 shows a configuration of an integrated metering system in accordance with an embodiment of the present invention.

FIG. 1 shows a configuration of an integrated metering system in accordance with an embodiment of the present invention.

The integrated metering system of FIG. 1 may correct and improve non-metered data by monitoring a metering data error and a non-metered section in an integrated remote metering infrastructure. For this, the integrated metering system includes a plurality of meters 110 that are installed at customers 105 and meter energy meterage hourly, daily and monthly, and a plurality of automatic meter reading (referred to as AMR, hereinafter) server 120 that are connected to the meters 110, respectively, and collect and manage metering data transmitted from the meters 110. The integrated metering system also includes an integrated remote metering apparatus 130 that monitors whether a metering data error occurs and a non-metered section occurs by monitoring the metering data and a prediction and correction apparatus 140 that improves metering data correction and effectiveness in a non-metered section when the non-metered section occurs according to a metering data error.

The metering data in accordance with an embodiment of the present invention are energy meterage information, which include meterages of electricity, gas, water supply, hot water and heating, for example, but not limited thereto.

The AMR server 120 receives energy use information, that is, metering data from the meter 110, and stores the received energy metering data in a first database 122. Such metering data may be operated and managed in a form of an energy load profile and stored in the first database 122.

The integrated remote metering apparatus 130 receives an energy load profile for each customer and a customer profile corresponding to customer information from the AMR server 120, monitors and synchronizes the received customer profile and energy load profile, and stores and manages the energy load profiled for each customer in a second database 132.

Further, the integrated remote metering apparatus 130 calculates a history statistical value of the energy load profile for each customer based on the energy load profile for the customer profile stored in the second database 132, and provides the prediction and correction apparatus 140 with the calculated history statistical value. In this regard, the history statistic value may be calculated on the basis of a change of the energy load profile during a predetermined period of an arbitrary customer.

Meanwhile, the integrated remote metering apparatus 130 may search for metering data of the same period zone as the non-metered section in the second database 132 according to a request of the prediction and correction apparatus 140 and then provide the prediction and correction apparatus 140 with the metering data.

The prediction and correction apparatus 140 includes a metering request unit 142, a metering data prediction unit 144, and a correction unit 146.

When a non-metered section exists, the metering request unit 142 requests the AMR server 120, which has transmitted metering data including the non-metered section, to perform a metering for the non-metered section.

The metering data prediction unit 144 generates predicted metering data for the non-metered section based on a starting point and the end point of the non-metered section.

The correction unit 146 corrects the predicted metering data based on a history statistical value and generates improved predicted metering data. The history statistical value may mean metering data or a statistical value of the metering data for day and month that have a time zone corresponding to the non-metered section. That is, the history statistical value may mean metering data of the previous day time zone corresponding to the non-metered section or a statistical value for metering data of the time zone corresponding to the non-metered section during a predetermined period in case that the non-metered section is the hour. It may mean metering data of the previous same day corresponding to the non-metered section or a statistical value for metering data on a day corresponding to the non-metered section during a predetermined period in a case that the non-metered section is the day. Further, it may mean metering data of the same month in the previous year corresponding to the non-metered section or a statistical value for metering data of the same month in the previous year corresponding to the non-metered section during a predetermined period.

Meanwhile, in accordance with an embodiment of the present invention, while it has been explained that the prediction and correction apparatus 140 is connected to the integrated remote metering apparatus 130 through a communication network 150 by way of an example, the metering section prediction and correction apparatus 140 may be incorporated in the integrated remote metering apparatus 130.

Next, when a non-metered section occurs, a process by which the integrated remote metering system corrects and improves the non-metered section will be explained with reference to FIG. 2.

Figure 2:
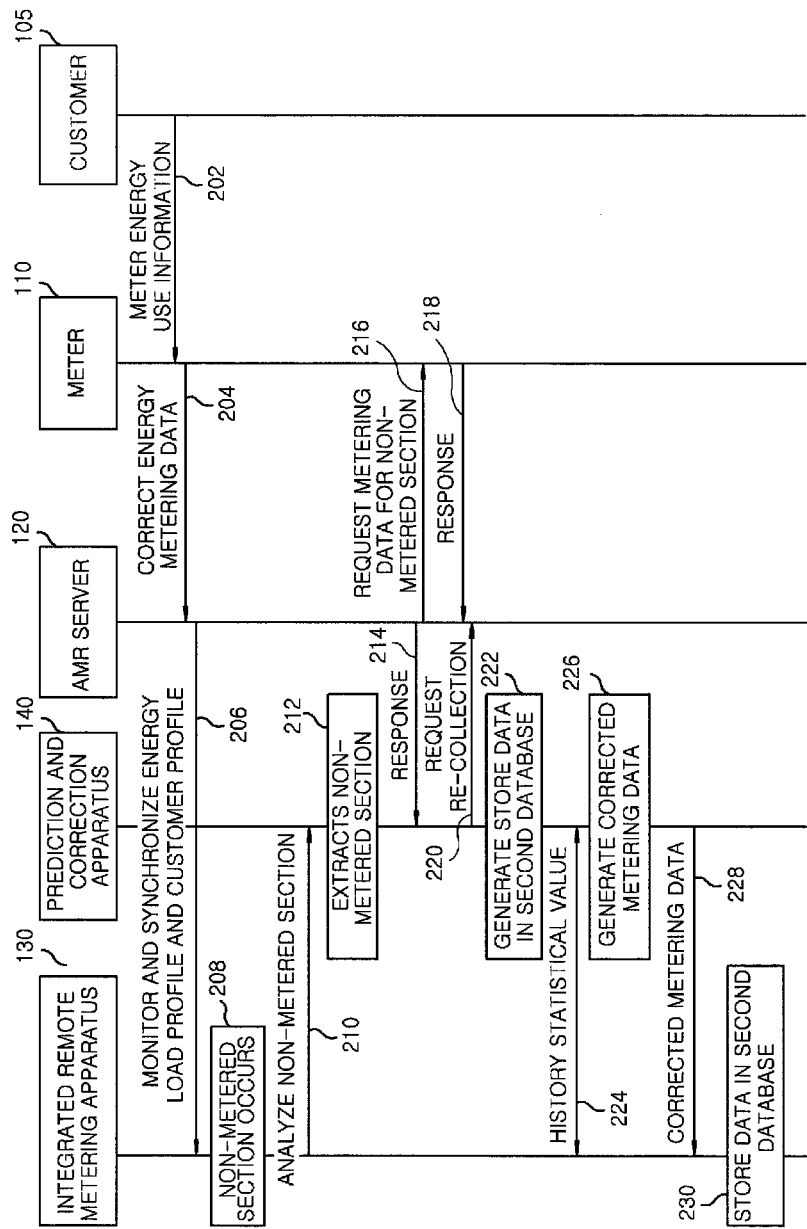
FIG. 2 is a sequential diagram illustrating how to predict and correct metering data for a non-metered section when the non-metered section occurs in an integrated remote metering system in accordance with an embodiment of the present invention.

FIG. 2 is a sequential diagram illustrating how to predict and correct a non-metered section when the non-metered section occurs in an integrated remote metering system in accordance with an embodiment of the present invention.

Referring to FIG. 2, energy use information from customer 105 is read by the meter 110 in an operation 202.

An AMR server 120 receives the energy use information, that is, metering data from the meter 110, thereby collecting energy metering data, in an operation 204. The received metering data are calculated hourly, daily and monthly and stored in a first database 122 for the management of the metering data. Such metering data may be operated and managed in a form of energy load profile and stored in a database.

The integrated remote metering apparatus 130 receives an energy load profile for each customer and a customer profile corresponding to customer information, monitors and synchronizes the received customer profile and energy load profile, in an operation 206, and stores and manages the energy load profile for each customer in the second database 132.

Meanwhile, the integrated remote metering apparatus 130 analyzes history information of an energy load profile for a customer that is stored and managed in the second database 132, and checks whether a metering data error and a non-metered section occur. When there occurs a metering data error and the non-metered section, in an operation 208, the integrated remote metering apparatus 130 requests the prediction and correction apparatus 140 to analyze the non-metered section, in an operation 210.

In response to the request, in an operation 212, the prediction and correction apparatus 140 extracts a non-metered section from the analyzed history information of an energy load profile.

The prediction and correction apparatus 140 requests the AMR server 120 based on the non-metered section to re-collect the metering data for the non-metered section, in an operation 214. Accordingly, the AMR server 120 requests the metering data of the non-metered section from the meter 110, in an operation 216.

In response to such a request, when receiving a response from the meter 110 in an operation 218, the AMR server 120 transmits the response received from the meter 110 to the prediction and correction apparatus 140, in an operation 220.

The prediction and correction apparatus 140 determines whether metering data for the non-metered section exists in the response. Further, when it is determined that the metering data for the non-metered section does not exist in the response, the prediction and correction apparatus 140 generates predicted metering data for the non-metered section, in an operation 222. A process to generate the predicted metering data will be described with reference to FIG. 3.

Thereafter, the prediction and correction apparatus 140 requests and receives a history statistical value for the non-metered section from the integrated remote metering apparatus 130, in an operation 224. Further, the prediction and correction apparatus 140 determines whether or not to correct by comparing the received history statistical value with the predicted metering data, and then generates corrected metering data by correcting the predicted metering data based on the history statistical value, in an operation 226. The corrected metering data generated as described above are provided to the integrated remote metering apparatus 130 and stored in the second database 132, in operations 228 and 230.

Meanwhile, when correction is not needed, the prediction and correction apparatus 140 may provide the predicted metering data to the integrated remote metering apparatus 130 and store it in the second database 132.

A process to generate the predicted metering data, determine whether or not to correct the predicted metering data and perform the correction will be described with reference to FIG. 3.

Figure 3:
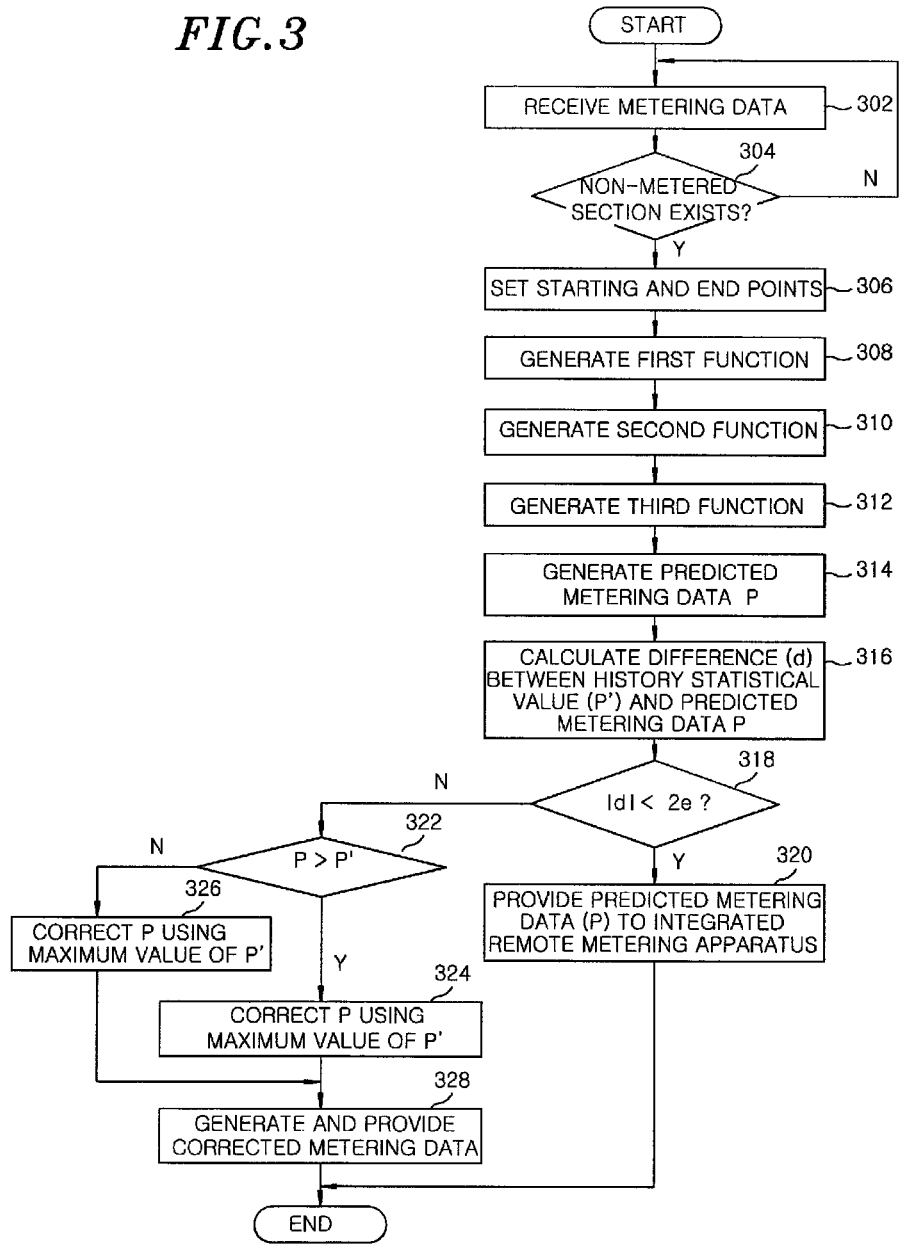
FIG. 3 is a flowchart illustrating a process to generate and correct predicted metering data for a non-metered section when the non-metered section occurs in accordance with an embodiment of the present invention.

FIG. 3 is a flowchart illustrating a process to generate and correct predicted metering data for a non-metered section when the non-metered section occurs in accordance with an embodiment of the present invention.

Referring to FIG. 3, first, when an energy load profile for an arbitrary customer 105, that is, metering data are received from the AMR server 120 in operation 302, the integrated remote metering apparatus 130 determines whether a non-metered section exists based on the energy load profile and a customer profile stored in the second database 132, in an operation 304. For example, when a section exists in which metering data checked in the state that a resident is in the customer is equal to or less than '0', it is determined that a non-metered section exists, and it is then determined whether the non-metered section is an hourly section, a daily section or a monthly section.

Hereinafter, a case where the non-metered section is hourly section will be described with reference to an example. The prediction and correction apparatus 140 sets a starting point of the non-metered section as $\alpha$ and the end point of the non-metered section as $\beta$, in an operation 306, and then generates a first function that passes through from a timing point after a first duration ($\alpha$+t) to a timing point after a second duration ($\beta$+t') on the basis of the end point of the non-metered section, in an operation 308.

Then, the prediction and correction apparatus 140 generates a second function that passes through from a timing point before the second duration ($\alpha$+t') to a timing point before the first duration ($\alpha$−t) on the basis of the starting point of the non-metered section, in an operation 310. Here, the first duration may be set to one hour, and the second duration may be set to two hours or an arbitrary time.

Subsequently, after generating an intersecting point that intersects the first and second functions, the prediction and correction apparatus 140 generates a third function that passes through an intersecting point, a timing point before the first duration ($\alpha$−t) of the non-metered section starting point and a timing point after the first duration ($\beta$+t) of the non-metered section end point, in an operation 312.

Thereafter, the prediction and correction apparatus 140 generates predicted metering data P for the non-metered section using the third function, that is, a function value from $\alpha$ to $\beta$ (that is, a value of y), in an operation 314.

The prediction and correction apparatus 140 may perform an improvement task for the predicted metering data P obtained through the process described above. First, the prediction and correction apparatus 140 compares previous metering data, for example, metering data in a time zone corresponding to the non-metered section of the previous day or two days ago, or a history statistical value P', with the predicted metering data P to calculate a difference d, in an operation 316, and determines whether the calculated difference d is within a predetermined effective scope 2e, in an operation 316. When the difference d is within the predetermined effective scope 2e as a result of the determination, in an operation 318, the prediction and correction apparatus 140 provides the integrated remote metering apparatus 130 with the predicted metering data P in an operation 320, and stores them in the second database 132.

When the difference d is not within the predetermined effective scope 2e, the prediction and correction apparatus 140 compares the predicted metering data P with metering data at the same time zone of the previous day or two days ago or history statistical value P' in size, in an operation 322.

When the predicted metering data P is greater than the metering data at the same time zone or history statistical value P' in size as a result of the comparison of the operation 322, the prediction and correction apparatus 140 maps the metering data at the same time zone or the maximum value of the history statistical value P' into the predicted metering data P, in an operation 324, to generate corrected metering data. When the predicted metering data P is equal to or less than the metering data at the same time zone or history statistical value P' in size, the prediction and correction apparatus 140 corrects the predicted metering data P using the minimum value of the history statistical value P', in an operation 326, to generate corrected metering data and provide the corrected metering data to the integrated remote metering apparatus 130, in an operation 328. Subsequently, the prediction and correction apparatus 140 stores the corrected metering data in the second database 132.

In case of not an hourly section but a daily section, t and t' may be changed with day to be processed. It will be described below.

First, after setting a starting day of the non-metered section as $\alpha$ and the end day of the non-metered section as $\beta$, the prediction and Correction apparatus 140 generates a function that passes through from a timing point after one day to a timing point after two days on the basis of the end day of the non-metered section.

Next, the prediction and correction apparatus 140 generates a function that passes through from a timing point before two days to a timing point before one day on the basis of a starting day of the non-metered section. Here, an example is used in which the function is generated on the basis of a timing point before one or two days and after one or two days, but not limited thereto.

Then, after calculating an intersecting point that intersects respective functions generated through the process described above, the prediction and correction apparatus 140 generates a function for the prediction that passes through an intersecting point, a timing point of the day before the non-metered section starting day and a timing point of the day after the non-metered section end day.

Subsequently, the prediction and correction apparatus 140 extracts a non-metered section, that is, function values from $\alpha$ to $\beta$ (that is, the value of y) from the function for prediction and generates predicted metering data for the non-metering section.

The prediction and correction apparatus 140 may perform an improvement task for the predicted metering data obtained through the process described above. First, the prediction and correction apparatus 140 compares previous metered data, for example, the metering data of three or four days before or a history statistical value with the predicted metering data to calculate a difference, and determines whether the calculated difference is within a predetermined effective scope. When the difference is within the predetermined effective scope, the prediction and correction apparatus 140 provides the predicted metering data to the integrated remote metering apparatus 130 and stores the same in the second database 132.

When the difference is not within the predetermined effective scope, the prediction and correction apparatus 140 corrects the predicted metering data through the operations 322 to 326.

In case of not a daily section but a monthly section, t and t' may be changed with month to be processed. It will be described below.

First, after setting a starting month of the non-metered section as $\alpha$ and the end month of the non-metered section as $\beta$, the prediction and correction apparatus 140 generates a function that passes through from a timing point after one month to a timing point after the two months on the basis of the end month of the non-metered section.

Then, the prediction and correction apparatus 140 generates a function that passes through from a timing point before two months to a timing point before one month on the basis of a starting month of the non-metered section. Here, an example is used in which the function is generated on the basis of a timing point before one or two months and after one or two months, but not limited thereto.

Subsequently, after calculating an intersecting point that intersects respective functions generated through the process described above, the prediction and correction apparatus 140 generates a function for the prediction that passes through an intersecting point, a timing point before one month from the non-metered section starting month and a timing point after one month from the non-metered section end month.

Then, the prediction and correction apparatus 140 extracts the non-metered section, that is, function values from α to β (that is, the value of y) from the function for prediction and generates predicted metering data for the non-metering section.

The prediction and correction apparatus 140 may perform a correction task for the predicted metering data obtained through the process described above. First, the prediction and correction apparatus 140 compares previous metered data, for example, the metering data before three or four months or a history statistical value to the predicted metering data to calculate a difference, and determines whether the calculated difference is within a predetermined effective scope. When the difference is within the predetermined effective scope, the prediction and correction apparatus 140 provides the predicted metering data to the integrated remote metering apparatus 130 and stores the same in the second database 132.

When the difference is not within the set effective scope, the prediction and correction apparatus 140 corrects the predicted metering data through steps 322 to 326.

An example that the prediction and correction apparatus 140 in accordance with an exemplary embodiment of the present invention generates predicted metering data and corrected metering data will be described with reference to FIGS. 4 to 6.

Figure 4:
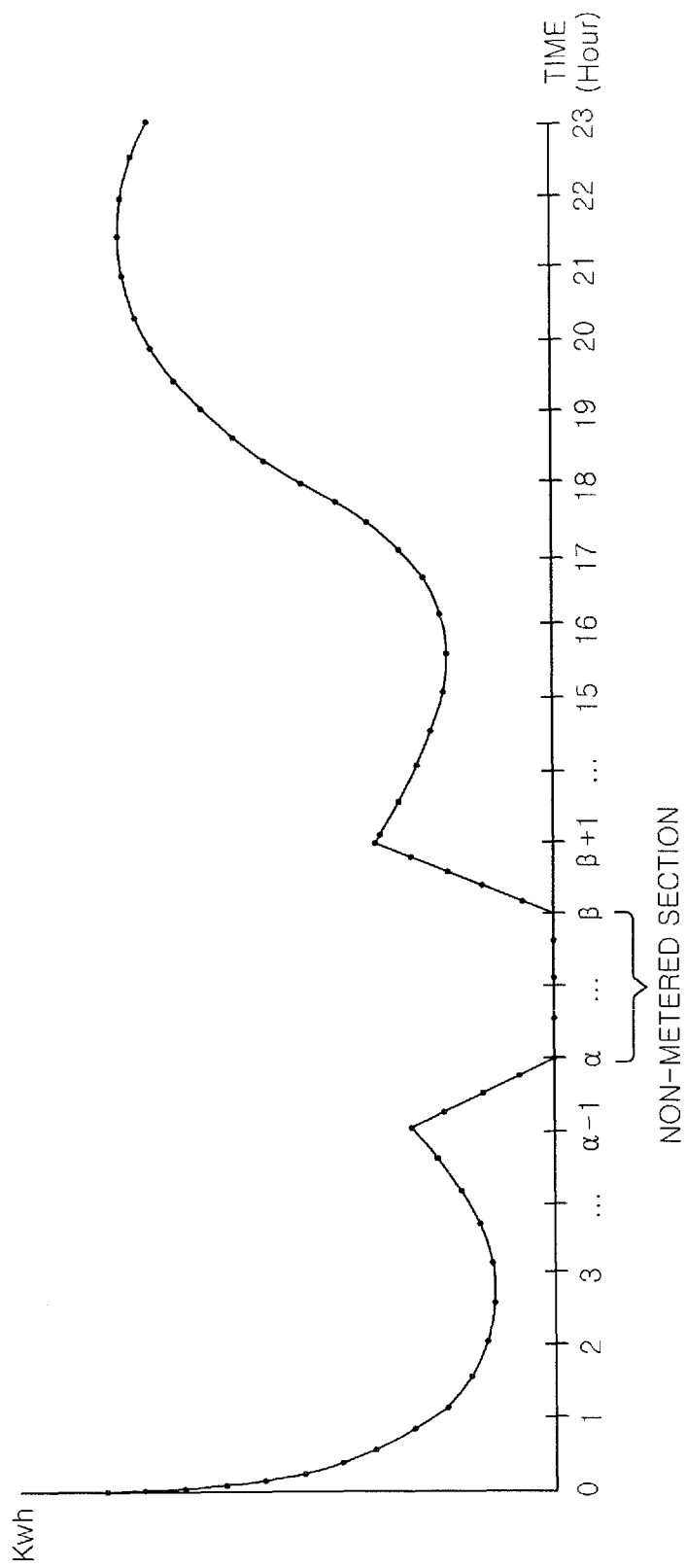
FIG. 4 is a graph illustrating remote metering data in which a non-metered section exists in accordance with an embodiment of the present invention.

The integrated remote metering apparatus 130 indicates remote metering data illustrated in FIG. 4 as a result of monitoring the remote metering data. That is, there are metering data values at 0 o'clock to (α−1) o'clock, and a metering data value collected from the AMR server 120 is denoted as 0 at α o'clock to β o'clock. Further, when the integrated remote metering apparatus 130 stably collects and monitors the metering data values from (β+1) o'clock, and then receives effective remote metering data, it recognizes that a non-metered section occurred in the remote metering data, and requests a task for the prediction and correction of the non-metered section to the prediction and correction apparatus 140. That is, the integrated remote metering apparatus 130 may request a correction for the non-metered section to the prediction and correction apparatus 140 in order to react to the demand reaction of a customer's energy meterage in real time.

Figure 5:
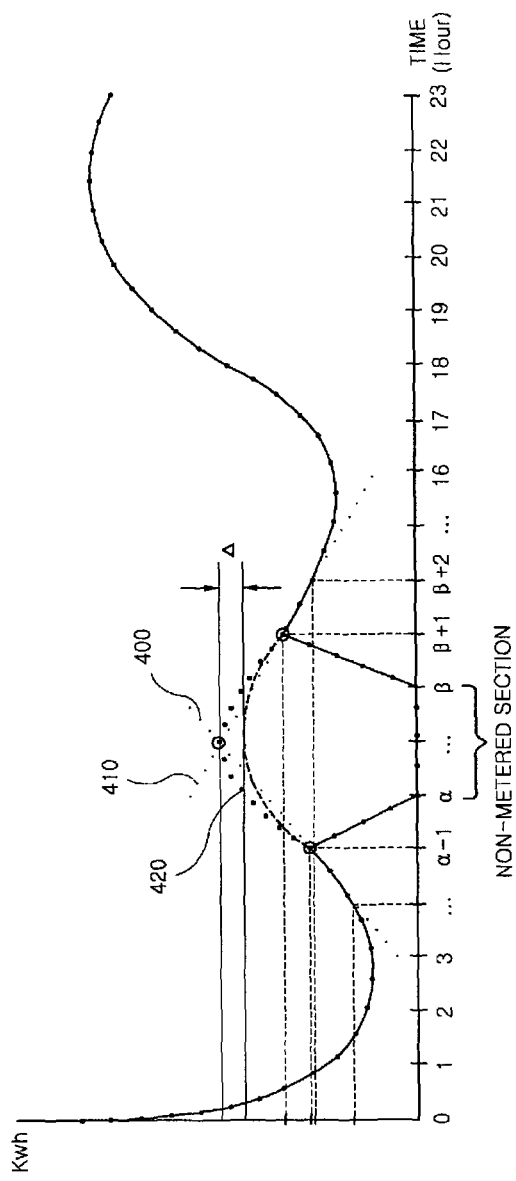
FIG. 5 is a graph explaining a process to generate predicted and corrected metering data for a remote non-metered section in order to identify a customer's energy meterage effectively.

FIG. 5 is a graph explaining a process to generate predicted and corrected metering data for a remote non-metered section in order to identify a customer's energy meterage effectively.

First, in order to correct metering data between α o'clock to β o'clock where a metering data value is 0, a first linear function 400 that passes through (α−2) o'clock and (α−1) o'clock may be calculated as in a following Equation 1. That is, a first linear function 400 that y coordinate passes through γ when x coordinate passes through (α−1) and a y coordinate passes through ε when another x coordinate passes through (α−2) may be calculated.

$$y = \frac{\gamma - \varepsilon}{(\alpha - 1) - (\alpha - 2)} x + A \qquad \text{EQ. 1}$$

Where A denotes a constant.

Further, the prediction and correction apparatus 140 may calculate a second linear function 410 as in a following Equation 2. That is, the prediction and correction apparatus 140 may calculate the second linear function 410 where y coordinate passes through δ when x coordinate passes through (β+1), and y coordinate passes through ζ when x coordinate passes through (β+2).

$$y = \frac{\zeta - \delta}{(\beta + 2) - (\beta + 1)} x + B \qquad \text{EQ. 2}$$

Where B denotes a constant.

After that, the prediction and correction apparatus 140 may determine a coordinate in which the calculated first and second linear functions 400 and 410 intersect with each other to be a third coordinate, and generate an estimation function 420 that passes through three coordinates as in a following Equation 3.

$$\left( \frac{A - B}{\zeta - \delta - \gamma + s}, \frac{(\gamma - s)(A - B)}{\zeta - \delta - \gamma + s} + A \right) \qquad \text{EQ. 3}$$

Where s denotes a constant.

The prediction and correction apparatus 140 may generate predicted metering data that may predict metering data for the non-metered section through the estimation function 420 that passes through the three coordinates in the Equation 3.

Thereafter, the prediction and correction apparatus 140 compares the predicted metering data and the history statistical value 430 of the non-metered section, that is, it may generate a difference Δ between an estimation function 420 corresponding to an approximate value of the non-metered section and metering data of the same time zone (period zone) as the non-metered section or the history statistical value 430. A small difference Δ is generated at α timing point or β timing point, and a relatively large difference Δ is generated between α timing point and β timing point. However, the predicted metering data may be greater or smaller than the history statistical value of a section between α timing point and β timing point.

The prediction and correction apparatus 140 may correct the estimation function 420 corresponding to predicted metering data by comparing such a difference Δ with a predetermined effective scope and generate corrected metering data.

That is, as illustrated in FIG. 6, when the difference Δ is within a double standard deviation 2σ of the history statistical value 430 at the same timing point, it is determined to be effective, and the predicted metering data is provided to the integrated remote metering apparatus 130 and stored in the second database 132.

Meanwhile, when the difference Δ is not within a double standard deviation 26 for the history statistical value 430 at the same timing point, the predicted metering data may be corrected by comparing a value of the predicted metering data with the maximum value of the history based statistical value. That is, when the value of the predicted metering data is greater than the maximum value of the history statistical value 430, is determined that the value of the predicted metering data is the maximum value of the history statistical value 430 at the same timing point. Further, when the value of the predicted metering data is smaller than the minimum value of the history statistical value 430, it is determined that the value of the predicted metering data is the minimum value of the history statistical value 430 at the same timing point, and the prediction and correction apparatus 140 generates the corrected metering data. The corrected metering data generated as described above may be provided to the integrated remote metering apparatus 130 and then stored in the second database 132.

As described above, although the present invention has explained hourly, daily, and monthly sections only by way of examples, a yearly section may also be used in the embodiment.

Further, while in the above constructional and operational method, it is explained by way of an example that the integrated remote metering apparatus 130 and the prediction and correction apparatus 140 are connected each other through a communication network 150, the prediction and correction apparatus 140 is included into the integrated remote metering apparatus 130.

While the description of the present invention has been made to the exemplary embodiments, various changes and modifications may be made without departing from the scope of the invention. Therefore, the scope of the present invention should be defined by the appended claims rather than by the foregoing embodiments.

What is claimed is:

1. A method, performed by an integrated metering system including an integrated remote metering apparatus and a prediction and correction apparatus, for predicting and correcting metering data in a non-metered section, the method comprising:
   collecting, by the integrated remote metering apparatus, actual energy-related metering data received from an automatic meter reading server, the actual energy-related metering data metered by a meter and transmitted from the meter to the automatic meter reading server;
   detecting, by the integrated remote metering apparatus, a non-metered section within the collected actual energy-related metering data;
   requesting, by the prediction and correction apparatus, metering data corresponding to the non-metered section to the automatic meter reading server and re-collecting re-transmitted actual energy-related metering data from the automatic meter reading server when the non-metered section is detected;
   generating, by the prediction and correction apparatus, predicted metering data for the non-metered section when the metering data corresponding to the non-metered section does not exist within the re-transmitted actual energy-related metering data; and
   generating corrected metering data for the non-metered section from the predicted metering data by analyzing the predicted metering data and the actual energy related metering data.

2. The method of claim 1, wherein the non-metered section has a starting point and an end point, and wherein said generating the predicted metering data comprises:
   generating a first function using metering data of a first section zone which is placed before the starting point of the non-metered section;
   generating a second function using metering data of a second section zone which is placed after the end point of the non-metered section;
   calculating an intersecting point of the first and second functions; and
   calculating predicted metering data for each timing point of the non-metered section by generating a third function that passes through the calculated intersecting point, a first coordinate of the first function, and a second coordinate of the second function.

3. The method of claim 2, wherein the first coordinate is an end portion of the first section zone and metering data of the end portion, and the second coordinate is a starting portion of the second section zone and metering data of the starting portion.

4. The method of claim 2, wherein the non-metered section is a unit of hour, day, month or year.

5. The method of claim 1, wherein said generating corrected metering data comprises:
   correcting the predicted metering data by comparing the predicted metering data calculated with the previous metered data corresponding to the non-metered section or a history statistical value of the previous metered data corresponding to the non-metered section.

6. The method of claim 5, wherein said generating corrected metering data comprises:
   calculating a difference between the previous metered data or the history statistical value and the predicted metering data;
   determining whether the difference is within a predetermined effective scope;
   setting, when the difference is within the predetermined effective scope, the predicted metering data as metering data for the non-metered section; and
   correcting, when the difference is not within a predetermined effective scope, predicted metering data of a portion which is not within the predetermined effective scope using the previous metered data or the maximum or minimum value of the history statistical value by comparing the predicted metering data of the portion which is not within the predetermined effective scope with the previous metered data or the history statistical value.

7. The method of claim 6, wherein said correcting using the maximum or minimum value comprises:
   correcting predicted metering data of the portion with the maximum value when predicted metering data of the portion having the difference is greater than the previous metered data or the history statistical value; and
   correcting the predicted metering data of the portion with the minimum value when predicted metering data of the portion having the difference is equal to or smaller than the previous metered data or history statistical value.

8. The method of claim 6, wherein the effective scope is calculated using the previous metered data or a standard deviation of the history statistical value.

9. An integrated metering system for predicting and correcting metering data in a non-metered section, the system comprising:
   an integrated remote metering apparatus configured to collect actual energy-related metering data received from an automatic meter reading server and detect a non-metered section within the collected actual energy-related metering data, wherein the actual energy-related metering data is metered by a meter and transmitted from the meter to the automatic meter reading server;

a prediction and correction apparatus comprising:
- a metering request unit configured to request metering data corresponding to the non-metered section to the automatic meter reading server and re-collect re-transmitted actual energy-related metering data from the automatic meter reading server when the non-metered section is detected;
- a metering data prediction unit configured to generate predicted metering data for the non-metered section when the metering data corresponding to the non-metered section does not exist within the re-transmitted actual energy-related metering data; and
- a correction unit configured to generate corrected metering data for the non-metered section from the predicted metering data by analyzing the predicted metering data and the actual energy related metering data.

10. The apparatus of claim 9, wherein the non-metered section has a starting point and an end point, and wherein the predicted metering data generation unit is configured to:
- generate a first function using metering data of a first section zone which is placed before the starting point of the non-metered section;
- generate a second function using metering data of a second section zone which is placed after the end point of the non-metered section and then calculates an intersecting point of the first and second functions; and
- generate a third function that passes through the calculated intersecting point, a first coordinate of the first function, and a second coordinate of the second function, thereby generating predicted metering data for each timing point of the non-metered section.

11. The apparatus of claim 10, wherein the first coordinate is an end portion of the first section zone and metering data of the end portion, and the second coordinate is a starting portion of the second section zone and metering data of the starting portion.

12. The apparatus of claim 9, wherein the correction unit is configured to correct the predicted metering data by comparing the predicted metering data calculated with the previous metering data corresponding to the non-metered section or a history statistical value of the previous metering data corresponding to the non-metered section.

13. The apparatus of claim 12, wherein the correction unit is configured to calculate a difference between the previous metered data or the history statistical value and the predicted metering data, and determine whether or not to correct the predicted metering data by determining whether the difference is within a predetermined effective scope.

14. The apparatus of claim 13, wherein the correction unit is configured to correct, when the difference is not within the predetermined effective scope, the predicted metering data of a portion which is not within the predetermined effective scope using the previous metered data or the maximum or minimum value of the history statistical value by comparing the predicted metering data of the portion and the previous metered data or the history statistical value.

15. The apparatus of claim 14, wherein the correction unit is configured to: correct predicted metering data of the portion with the maximum value when predicted metering data of the portion having the difference is greater than the previous metered data or the history statistical value; and correct the predicted metering data of the portion with the minimum value when the predicted metering data of the portion having the difference is equal to or smaller than the previous metered data or the history statistical value.

16. The apparatus of claim 14, wherein the effective scope is calculated using the previous metered data or a standard deviation of the history statistical value.

17. An integrated metering system for predicting and correcting metering data in a non-metered section, the system comprising:
- a means for collecting actual energy-related metering data received from an automatic meter reading server and detect a non-metered section within the collected actual energy-related metering data, wherein the actual energy-related metering data is metered by a meter and transmitted from the meter to the automatic meter reading server;
- a means for requesting metering data corresponding to the non-metered section to the automatic meter reading server and re-collect re-transmitted actual energy-related metering data from the automatic meter reading server when the non-metered section is detected;
- a means for generating predicted metering data for the non-metered section when the metering data corresponding to the non-metered section does not exist within the re-transmitted actual energy-related metering data, wherein the non-metered section has a starting point and an end point and is caused by a faulty data transmission between a customer meter and the automatic meter reading server; and
- a means for generating corrected metering data for the non-metered section from the predicted metering data by analyzing the predicted metering data and the actual energy related metering data, wherein the customer's demand reaction is capable of being measured in real time.

18. The system of claim 17, wherein the means for generating predicated metering data:
- generates a first function using metering data of a first section zone which is placed before the starting point of the non-metered section;
- generates a second function using metering data of a second section zone which is placed after the end point of the non-metered section and then calculates an intersecting point of the first and second functions; and
- generates a third function that passes through the calculated intersecting point, a first coordinate of the first function, and a second coordinate of the second function, thereby generating predicted metering data for each timing point of the non-metered section.

19. The system of claim 18, wherein the first coordinate is an end portion of the first section zone and metering data of the end portion, and the second coordinate is a starting portion of the second section zone and metering data of the starting portion.

20. The system of claim 19, wherein the means for correcting the predicted metering data compares the predicted metering data calculated with the previous metering data corresponding to the non-metered section or a history statistical value of the previous metering data corresponding to the non-metered section.

* * * * *